United States Patent
Herrera E.

(10) Patent No.: US 6,812,963 B1
(45) Date of Patent: Nov. 2, 2004

(54) FOCUS AND EXPOSURE MEASUREMENT IN DIGITAL CAMERA USING CHARGE BINNING

(75) Inventor: Oscar R Herrera E., Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/430,774

(22) Filed: Oct. 29, 1999

(51) Int. Cl.$^7$ .................................................. H04N 9/07
(52) U.S. Cl. ..................... 348/266; 348/272; 348/280
(58) Field of Search ............................... 348/266, 282, 348/283, 295, 298, 272, 280

(56) References Cited

U.S. PATENT DOCUMENTS

| | | | |
|---|---|---|---|
| 4,500,915 A | * | 2/1985 | Koike et al. ................ 348/283 |
| 5,278,661 A | * | 1/1994 | Wakagi et al. ............... 348/249 |
| 5,287,192 A | * | 2/1994 | Iizuka ......................... 348/311 |
| 5,552,827 A | * | 9/1996 | Maenaka et al. ........... 348/266 |
| 5,572,011 A | * | 11/1996 | Goto ......................... 250/201.2 |
| 5,815,748 A | * | 9/1998 | Hamamura et al. ......... 396/104 |
| 5,943,095 A | * | 8/1999 | Nakashiba .................. 348/311 |
| 6,169,577 B1 | * | 1/2001 | Iizuka ......................... 348/317 |
| 6,236,433 B1 | * | 5/2001 | Acharya et al. ............. 348/273 |
| 6,496,224 B2 | * | 12/2002 | Ueno ........................ 348/322 |

* cited by examiner

Primary Examiner—Andrew Christensen
Assistant Examiner—Tia Harris

(57) ABSTRACT

Apparatus and techniques for transferring image signals to readout electronics from image sensors. Electronic charges from multiple photosensitive elements are combined during and after transfer to detection electronics resulting in a greater signal to noise ratio. This enhanced signal to noise ratio provides the ability to make focus and exposure level measurements at lower light levels and often at greater speeds.

2 Claims, 12 Drawing Sheets

FOCUS AND EXPOSURE MEASUREMENT IN DIGITAL CAMERA USING CHARGE BINNING

FIELD OF THE INVENTION

The present invention relates generally to image sensors, more particularly to techniques for transferring image signals to readout electronics from image sensors, and even more particularly to techniques for transferring image signals to readout electronics from area image sensors, such as charge coupled devices (CCD's), for measuring image focus and/or image exposure level.

BACKGROUND OF THE INVENTION

An image detection system, as for example a digital camera, comprises an image sensor to detect the image and readout electronics for collecting the charge from that image sensor. Among other techniques, modern image sensors can be fabricated using solid state technologies such as those of Charge Coupled Devices (CCD's). Some image sensors integrate the light incident upon each of its individual elements. For such image sensors, the longer the photosensitive elements are exposed to the image, the stronger the signal obtained. Also for a fixed exposure time in such image sensors, the lower the ambient light, the lower the signal level obtained with an associated lower signal to noise level. Exposure time on the upper end is limited by the fact that the resultant image will be blurred if the source of the image moves appreciably during the time of the exposure.

Typically, an area image sensor comprises a number of adjacent horizontal rows or lines which are comprised of individual photosensitive detection areas referred to as pixels. If the image sensor has the ability to detect various color components of the image, each pixel is further divided into appropriate detection elements which typically detect additive primary colors. The pixels thus arranged detect a two dimensional representation or image of the source of that image.

Image sensors using CCD technology are now used in single frame cameras, referred to as digital still cameras (DSC). Such cameras often include capabilities for automatic focus and exposure level adjustment. There are three image sensor readout architectures currently in common use in commercial DSC's: frame transfer, interline progressive-scan, and interline interlace-scan. Readout of the image from the image sensor depends upon which architecture is used. In a frame transfer image sensor, horizontal lines of pixels are shifted downward into a horizontal readout shift register one line at a time. While in the horizontal readout shift register, the pixels of each line are read out horizontally one pixel at a time into a detection circuit. If the frame transfer image sensor includes additional storage lines, the time required to transfer a frame is increased accordingly.

For an interline progressive-scan image sensor, the readout is performed by first shifting the image charge from all photosensitive element sites into light protected, vertical interline image sensor registers, shifting this charge down one line at a time into a horizontal readout register, and finally shifting each line out of the horizontal readout register one element at a time into a detection circuit.

The process is similar for an interline interlace-scan image sensor, except that only odd lines or even lines are selected at one time to be shifted out of the photosensitive sites into the vertical interline image sensor registers. Two passes in an interline interlace-scan image sensor are required to read all the image charge out of the image sensor. Other image sensors, in particular those not capable of directly addressing specific, individual pixels may have similar architectures.

Signal to noise ratios available with current image capture devices describe the result of the physical phenomena which limits their ability to obtain proper focus and appropriate exposure settings under low light level conditions. There is an ongoing need for the ability to obtain exposures using digital cameras at lower and lower light levels. Thus, there is a need for an improved image readout technique to increase the signal to noise ratio for image detectors under such conditions.

In addition, automatic focus and the automatic adjustment of exposure level may require the readout of several images prior to detection of the final, focused image. These added image acquisitions increase the total time the image source needs to remain still in order to obtain a clear image. Together, these requirements add to the total time required to obtain a single final image. Present methods have the disadvantage of a lengthy time between shutter release and final image capture. Thus, there is an added need for an improved image readout technique to shorten the time required to perform auto-focus and the determination of exposure level in a digital camera.

SUMMARY OF THE INVENTION

In representative embodiments, the present patent document discloses methods and apparatus for measuring parameters such as, but not limited to, focus and exposure level for recording images with an image recording system such as, for example, an electronic single frame digital camera having a frame transfer, interline progressive-scan, or interline interlace-scan charge coupled device (CCD). Techniques are described for combining or binning charge from odd and even rows even when the associated colors detected are different. By such binning, the signal to noise ratio is increased when making such measurements, thereby permitting use under lower light level conditions.

In addition, under certain conditions readout time for focus and exposure adjustment can be reduced which improves the overall shutter button to image capture time. Reducing readout times is especially desirable because multiple focus and exposure readouts may be required to acquire one image. Obtaining a focus or exposure value in fewer scans will result in reduced time to image capture. In particular, in previous interline interlace-scan systems, focusing, setting exposure level, and the exposure of the final image have each included reading the charge from full frames two times each—once for the odd rows and once for the even rows. In addition, it is often necessary to read out multiple frames in order to set the focus and/or exposure. Using the techniques of charge binning disclosed herein odd and even rows can be readout together.

While the term pixel may have various meanings, it is used herein to mean the smallest, repeated block of photosensitive elements used for image detection in an image sensor. If the image sensor can resolve colors, the pixel includes the smallest, repeated block of color sensitive photosensitive elements used. The pixels are typically located in a two dimensional array comprising a number of adjacent horizontal rows or lines with each line comprised of individual photosensitive detection elements. The pixels thus arranged detect a two dimensional representation or image of the source of that image.

In representative embodiments, the invention is applicable to various types of image sensors including, but not limited to, frame transfer image sensor's, interline progressive-scan image sensor's, interline interlace-scan image sensors. It is applicable to image sensors fabricated using CCD technology, as well as other image sensors which generally read approximately a full frame instead of reading only signals from specific pixels.

An interline interlaced-scan image sensor is used as an example in a representative embodiment. Signal to noise level is increased and readout time is reduced for an exposure of the image sensor by combining charge from adjacent photosensitive elements in this embodiment. While the representative embodiment utilizes an image sensor in interline interlace-scan transfer mode as the image sensor, other types of image sensors and other modes of transfer may be used in other embodiments to gain enhanced performance.

Other aspects and advantages of the present invention will become apparent from the following description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages.

BRIEF DESCRIPTION OF THE PREFERRED EMBODIMENT

1. Introduction

Figure 1:
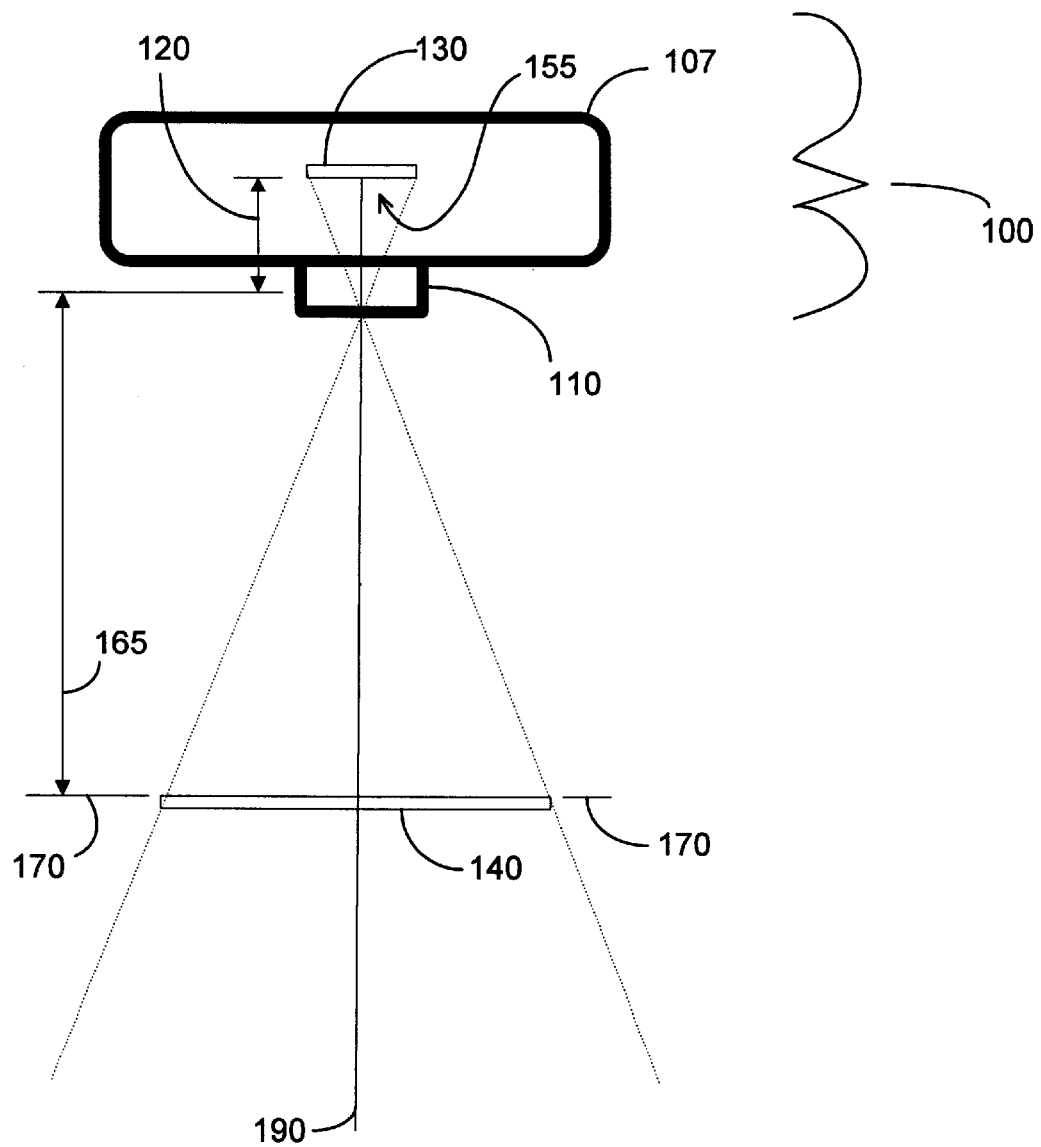
FIG. 1 is a drawing of an image recording system.

As shown in the drawings for purposes of illustration, the present patent document relates to methods for measuring parameters such as, but not limited to, focus and exposure level for recording images with an image recording system such as, for example, an electronic single frame digital camera having a frame transfer, interline progressive-scan, or interline interlace-scan charge coupled device (CCD). In representative embodiments, the present patent document describes techniques for increasing the signal to noise ratio when making such measurements, thereby permitting use under lower light level conditions.

In addition, under certain conditions readout time for focus and exposure adjustment can be reduced which improves the overall shutter button to image capture time. Reducing readout times is especially desirable because multiple focus and exposure readouts may be required to acquire one image. Obtaining a focus or exposure value in fewer scans will result in reduced time to image capture. In particular, in previous interline interlace-scan systems, focusing, setting exposure level, and the exposure of the final image have each included reading the charge from full frames two times each—once for the odd rows and once for the even rows. In addition, it is often necessary to read out multiple frames in order to set the focus and/or exposure. For focus and exposure settings, the present patent document describes techniques for combining charge from odd and even rows with an associated reduction in the number of exposure frames read even when the associated colors detected are different.

While the term pixel may have various meanings, it is used herein to mean the smallest, repeated block of photosensitive elements used for image detection in an image sensor. If the image sensor can resolve colors, the pixel includes the smallest, repeated block of color sensitive photosensitive elements used. The pixels are typically located in a two dimensional array comprising a number of adjacent horizontal rows or lines with each line comprised of individual photosensitive detection elements. The pixels thus arranged detect a two dimensional representation or image of the source of that image.

In representative embodiments, the invention is applicable to various types of image sensors including, but not limited to, frame transfer image sensor's, interline progressive-scan image sensor's, interline interlace-scan image sensor's. It is applicable to image sensors fabricated using CCD technology, as well as other image sensors which generally read approximately a full frame instead of reading only signals from specific pixels.

An interline interlaced-scan image sensor is used as an example in a representative embodiment. Signal to noise level is increased and readout time is reduced for an exposure of the image sensor by combining charge from adjacent photosensitive elements in this embodiment. While the representative embodiment utilizes an image sensor in interline interlace-scan transfer mode as the image sensor, other types of image sensors and other modes of transfer may be used in other embodiments to gain enhanced performance.

2. Image Sensor System

FIG. 1 is a drawing of an image recording system 100. In a preferred embodiment, the image recording system 100 comprises a lens 110 and an image sensor 130, wherein the lens 110 is placed at a lens-to-plane-of-exposure distance 120, from the image sensor 130. In various representative embodiments image recording system 100 could be, for example, digital still camera 100, digital video camera 100, or the like. Also shown in FIG. 1 is a case 107 within or to which the various components of the image recording system 100 are contained or mounted.

In FIG. 1, an object 140, which could be for example a sheet of paper 140 or other document 140, is placed along the object's 140 optical axis 190 at an object to lens distance 165 from the lens 110. When the lens 110 is adjusted until a focused image 155 of the object 140 is projected onto the image sensor 130, the object 140 lies in the image sensor's 130 focal plane 170. When the lens 110 is otherwise adjusted, the image 155 of the object 140 projected onto the image sensor 130 will be out of focus.

It will be understood that the term lens 110 as used herein includes a system of lenses 110. Also, by optical axis 190 is meant a line drawn perpendicular to the plane of the lens 110 and through the optical center of the lens 110.

Figure 2:
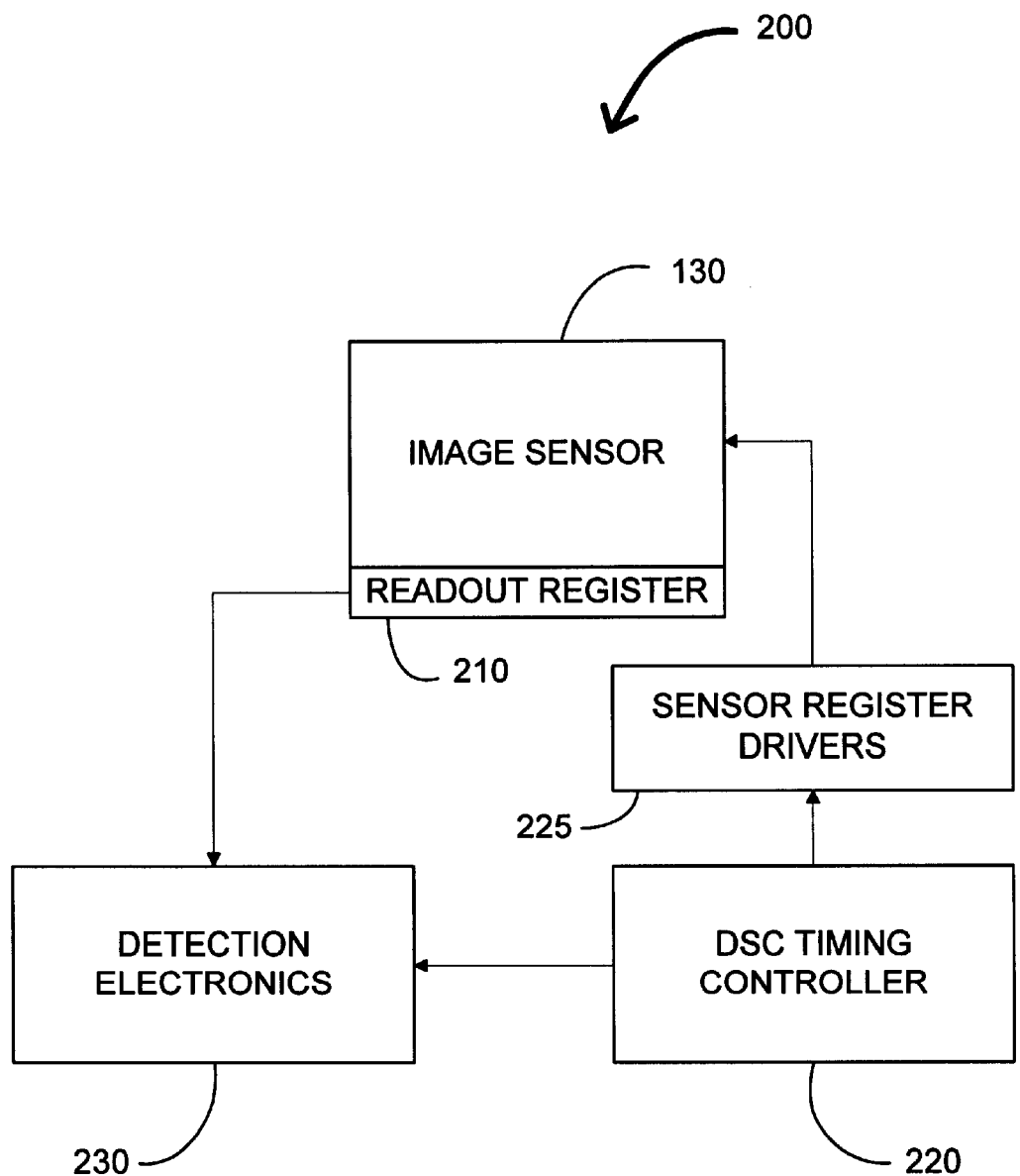
FIG. 2 is a drawing of a representative embodiment of an image detection system.

FIG. 2 is a drawing of a representative embodiment of an image detection system 200. The image detector system 200 comprises the image sensor 130, a readout register 210, detection electronics 230, a DSC timing controller 220, and sensor register drivers 225. The image sensor 130 detects the image 155 incident on it and transfers the charge signal from the image 155 into the readout register 210 which in this embodiment is shown as a part of the image sensor 130. It is not, however, required that the readout register 210 be a part of the image sensor 130. The DSC timing controller 220 sends signals to the sensor register drivers 225 to control the transfer of the charge signal of the image 155 from the image sensor 130 to the readout register 210 and then to the detection electronics 230. In a representative embodiment, the image sensor system 300 could be, for example, a digital camera; and the DSC timing controller 220 could be a timing generator or programmable sequencer.

Figure 3:
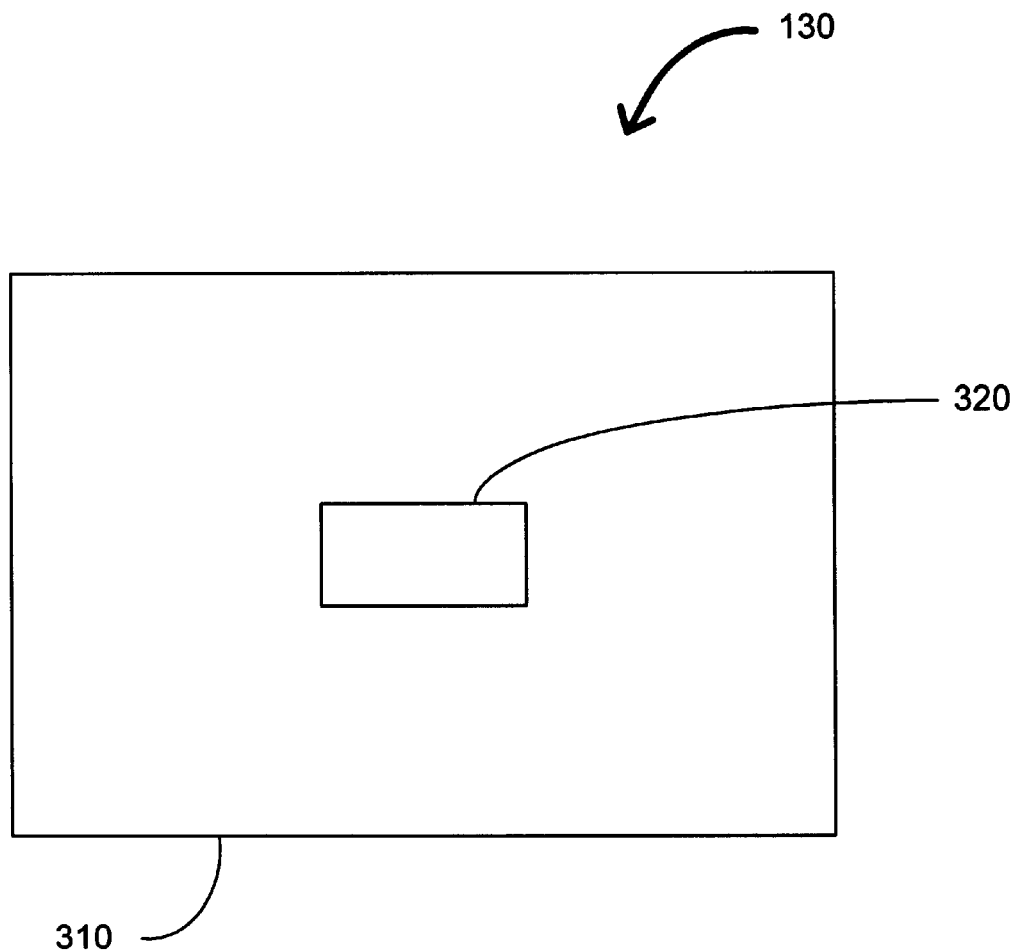
FIG. 3 is a drawing of an image sensor having a detection area and a sub-area for adjustment of focus and exposure level.

FIG. 3 is a drawing of the image sensor 130 having a detection area 310 and a sub-area 320 for adjustment of focus and exposure level. In typical use, the image 155, not shown in FIG. 3, would focused onto the detection area 310. The result of this exposure of the image 155 to the detection area 310 is the creation of image charge signals in each photosensitive element of the detection area 310 which is representative of the image 155. The image charge signal is and subsequently transferred to the detection electronics 230. However, when automatically focusing or setting the exposure level, it is typically only the sub-area 320 generally located in the center of the detection area 310 that is of importance. In various implementations, multiple sub-areas 320 could be used for focusing. Image charge from the remainder of the detection area 310 is ignored.

3. Charge Binning and Image Sensors

Figure 4A:
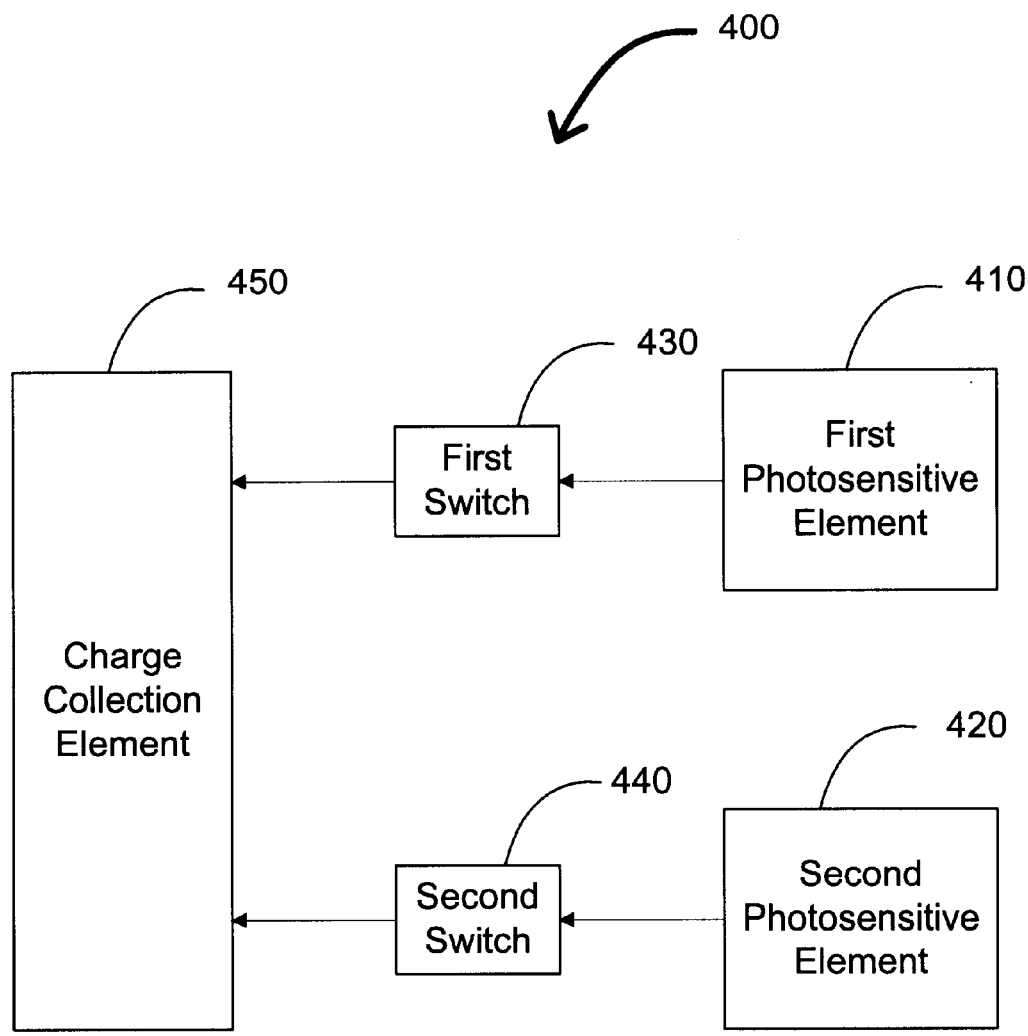
FIG. 4A is a drawing of an optical detection system as described in a representative embodiment of the present patent document.

FIG. 4A is a drawing of an optical detection system 400 as described in a representative embodiment of the present patent document. A first photosensitive element 410 and a second photosensitive element 420 are exposed to light from image 155 not shown in FIG. 4A. In a representative embodiments, the first photosensitive element 410 and the second photosensitive element 420 are sensitive to different regions of the color spectrum. Charge from the first photosensitive element 410 is transferred to a charge collection element 450 when a first switch 430 connecting the first photosensitive element 410 to the charge collection element 450 is closed. Charge from the second photosensitive element 420 is transferred to the charge collection element 450 when a second switch 440 connecting the second photosensitive element 420 to the charge collection element 450 is closed. The process of combining charge from separate photosensitive elements 410,420 is referred to as charge binning. Note that the thermal noise from the two photosensitive elements 410,420 is random within each photosensitive element 410,420 and thus not correlated with each other. As such, the thermal noise level in the charge collection element 450 from first and second photosensitive elements 410,420 will add as the square root of the sum of the squares. Charge from the two photosensitive elements 410, 420 adds as a linear sum. Thus, the signal to noise level in the charge collection element 450 is greater than either of the two individual photosensitive elements 410,420.

Figure 4D:
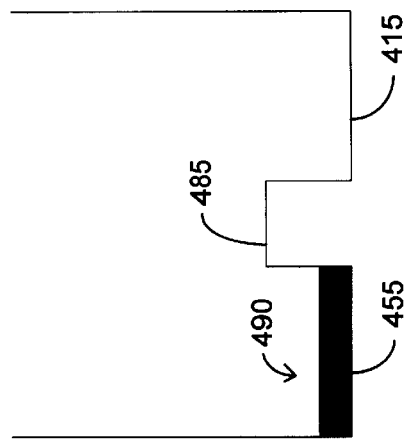
FIG. 4D is yet another drawing of idealized potential wells in a charge coupled device as described in a representative embodiment of the present patent document.

Switches 430,440 are shown for illustrative purposes. In typical embodiments in a CCD, switches 430,440 are not required or used. Instead, potential shifts in the charge collection element 450 with respect to first and second photosensitive elements 410,420 are used to move electronic charge from the first and second photosensitive elements 410,420 to the charge collection element 450. FIG. 4B is a drawing of idealized potential wells in a charge coupled device as described in a representative embodiment of the present patent document. For illustrative purposes only, potential wells in FIG. 4B and subsequent drawings have been drawn with idealized abrupt transitions in potential rather than more realistic smooth transitions. Using the first photosensitive element 410 as an example, the photosensitive element potential 415 represents the potential in the photosensitive element 410. Also shown in FIG. 4B is photo-generated electronic charge 490 in the photosensitive element 410. The barrier potential 485 represents the potential in a region, for example, of impurities diffused into the CCD substrate to prevent undesired diffusion of charge out of the first photosensitive element 410 and into the charge collection element 450 whose potential is represented by a charge collection element potential 455.

Figure 4C:
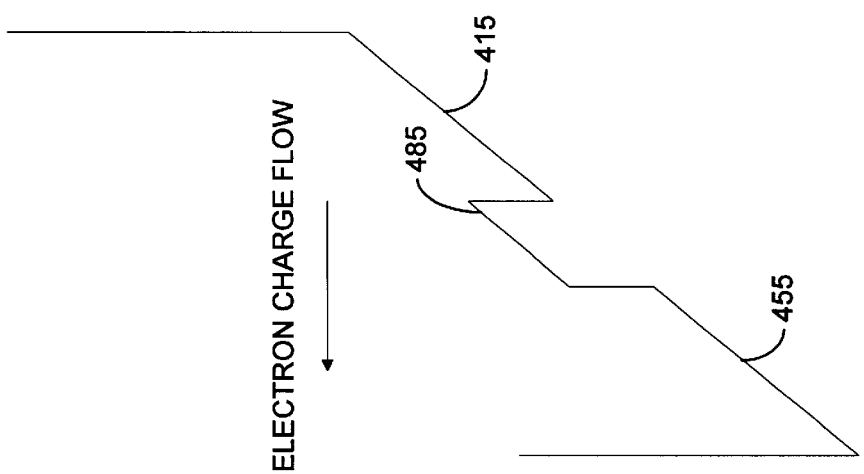
FIG. 4C is another drawing of idealized potential wells in a charge coupled device as described in a representative embodiment of the present patent document.
Figure 4B:
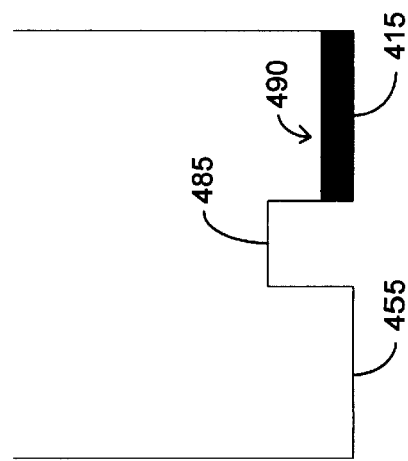
FIG. 4B is a drawing of idealized potential wells in a charge coupled device as described in a representative embodiment of the present patent document.

FIG. 4C is another drawing of idealized potential wells in a charge coupled device as described in a representative embodiment of the present patent document. In this figure a positive voltage with respect to the first photosensitive element 410 has been applied to the charge collection element 450. Photo-generated electronic charge 490, also referred to herein as electronic charge 490, from the first photosensitive element 410 is forced from the first photosensitive element 410 to the charge collection element 450.

FIG. 4D is yet another drawing of idealized potential wells in a charge coupled device as described in a representative embodiment of the present patent document. Once the electronic charge 490 has been forced to the charge collection element 450, the potential on the charge collection element 450 is restored to that of the first photosensitive element 410 and the electronic charge 490 is trapped in the charge collection element 450.

Figure 5:
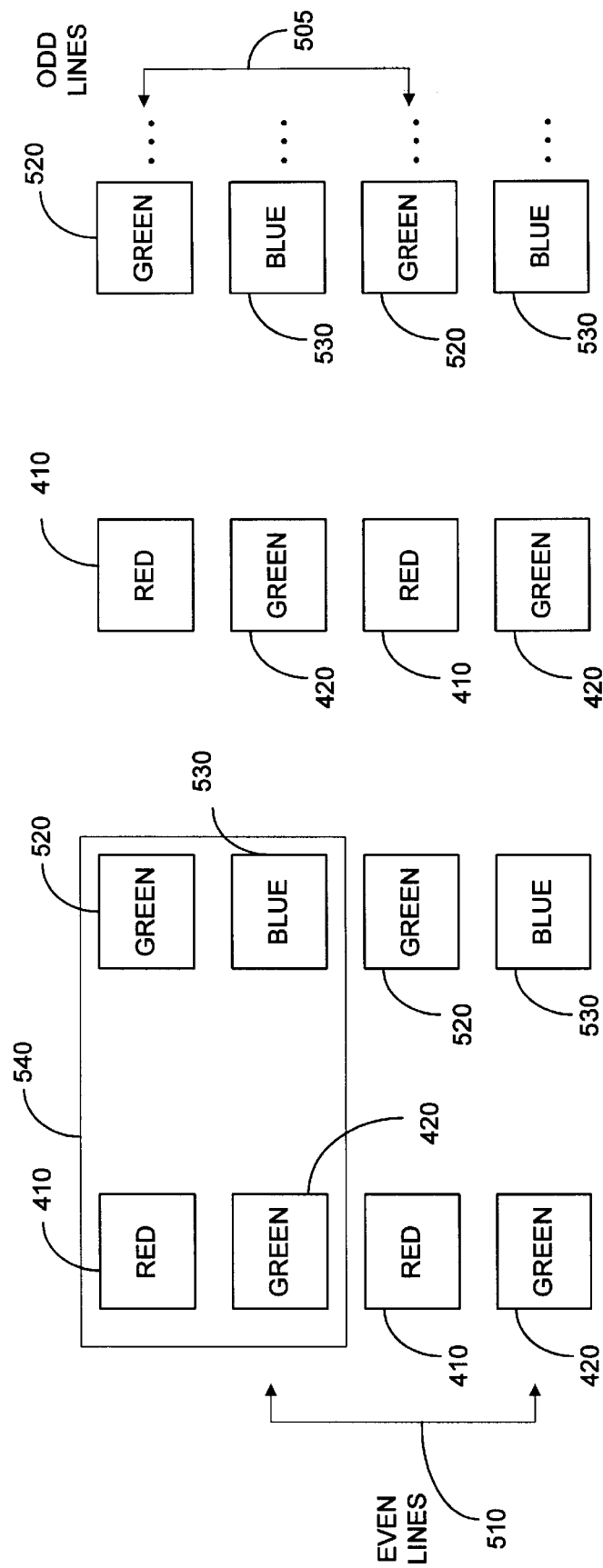
FIG. 5 is a drawing of example odd and even lines of a color sensitive image sensor as described in a representative embodiment of the present patent document.

FIG. 5 is a drawing of example odd and even lines 505,510 of a color sensitive image sensor 130 as described in a representative embodiment of the present patent document. The odd lines 505, also referred to herein as the first horizontal detection rows 505, are composed of alternating first and third photosensitive elements 410,520, and the even lines 510, also referred to herein as the second horizontal detection rows 510, are comprised of alternating second and fourth photosensitive elements 420,530. In this representative example, the combination of adjacent first, second, third, and fourth photosensitive elements 410,420,520,530 form a pixel 540 which is the smallest, repeating block of photosensitive elements used for image detection in the image sensor 130. The pixels 540 thus arranged detect a color sensitive, two dimensional representation or image 155 of the object 140, the source of that image 155.

Figure 6:
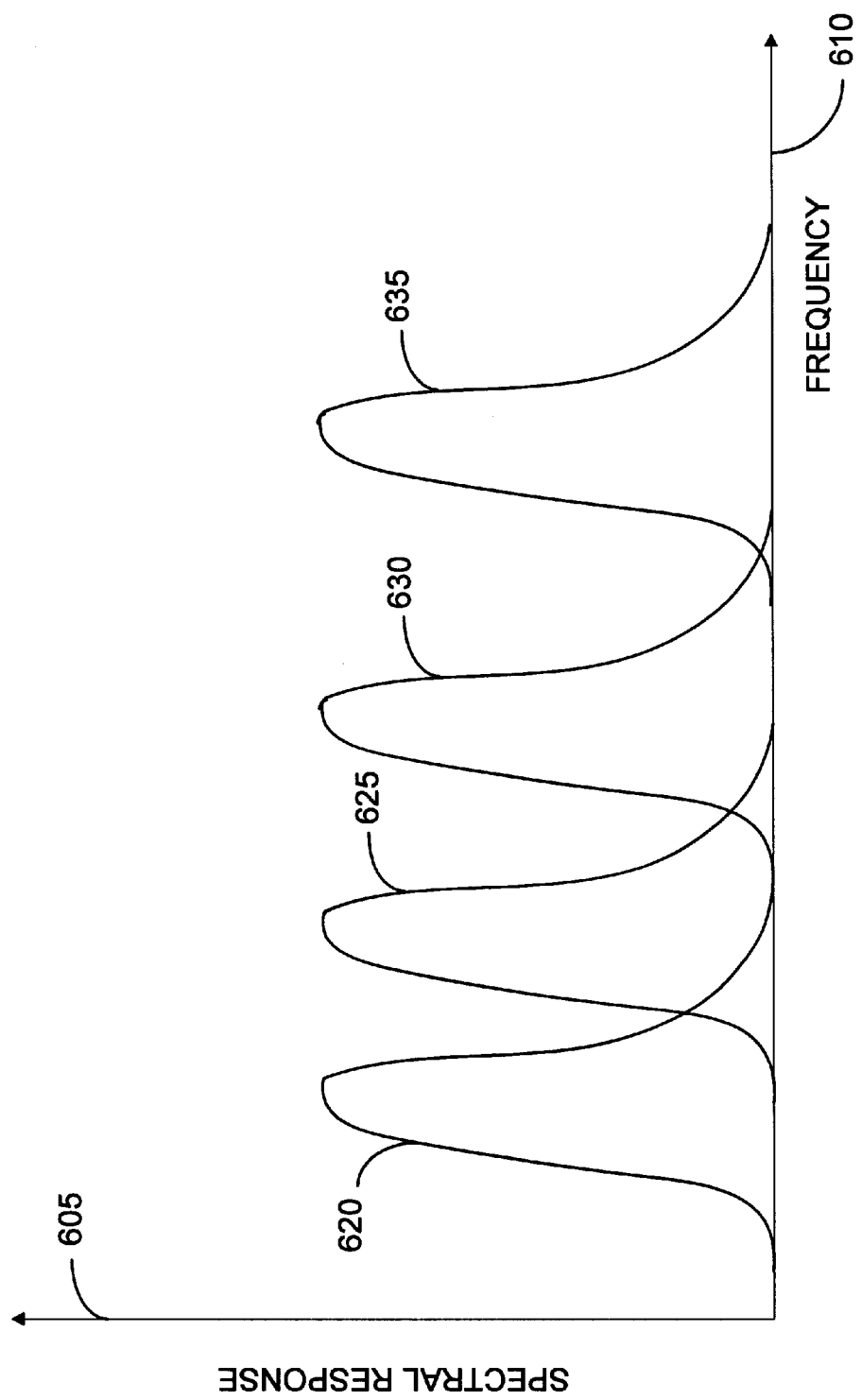
FIG. 6 is a graph of a spectral response vs. frequency of image sensor photosensitive elements as described in a representative embodiment of the present patent document.

FIG. 6 is a graph of a spectral response 605 vs. frequency 610 of image sensor 130 photosensitive elements 410,420, 520,530 as described in a representative embodiment of the present patent document. Spectral response for first photosensitive element 410 is first spectral response 620; spectral response for second photosensitive element 420 is second spectral response 625; spectral response for third photosensitive element 520 is third spectral response 630; and spectral response for fourth photosensitive element 530 is fourth spectral response 635.

In the example embodiment of FIG. 5, the first photosensitive element 410 is most sensitive to the red segment of the optical spectrum corresponding to the first spectral response 620 of FIG. 6; the second photosensitive element 420 is most sensitive to the green segment of the optical spectrum corresponding to the second spectral response 625 of FIG. 6; and the fourth photosensitive element 530 is most sensitive to the blue segment of the optical spectrum corresponding to the fourth spectral response 635 of FIG. 6. Also, in FIG. 5 the third photosensitive element 520 is most sensitive to the green segment of the optical spectrum. In this example, the second spectral response 625 and the third spectral response 630 would be substantially identical, not separated in frequency 610 as shown in FIG. 6. Due to the nature of color combination by the human eye, three colors are all that are required to accurately reproduce color for viewing. The arrangement of the pixel 540 shown in FIG. 5 is referred to as a Bayer photosensitive element pattern 540. This particular pattern enhances green response since green has twice the number of detection elements as do red and blue. Doubling the number of green detection elements provides an optical response that more closely matches that of the human eye. However, other patterns in other embodiments of the invention are also possible.

Figure 7:
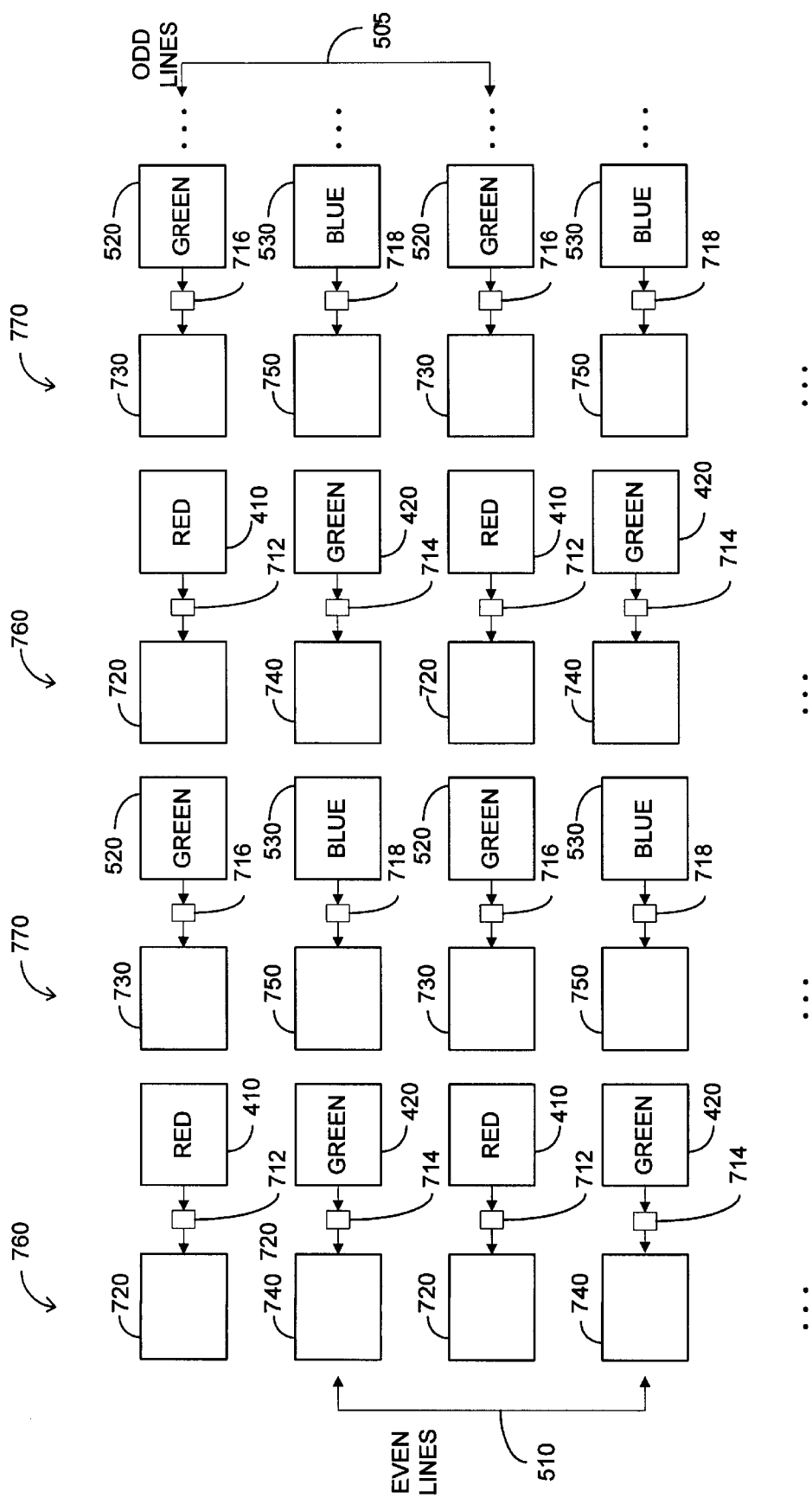
FIG. 7 is a drawing of the example image sensor of FIG. 5 with typical interline scan as described in a representative embodiment of the present patent document.

FIG. 7 is a drawing of the example image sensor 130 of FIG. 5 with typical interline scan as described in a representative embodiment of the present patent document. In FIG. 7, for illustrative purposes first photosensitive elements 410 are connected to first switches 712. First switches 712 are also connected to first charge collection elements 720. In typical operation, when activated first switches 712 transfer charge from first photosensitive elements 410 to first charge collection elements 720. In addition, second photosensitive elements 420 are connected to second switches 714. Second switches 714 are also connected to third charge collection elements 740. When activated second switches 714 transfer charge from second photosensitive elements 420 to third charge collection elements 740. First and third charge collection elements 720,740 are arranged in first vertical collection columns 760. Charge collected by first and third charge collection elements 720,740 are transported vertically downward in first vertical collection columns 760 via a set of phased potentials to the readout register 210 in the manner common to CCD's.

Also in FIG. 7, for illustrative purposes third photosensitive elements 520 are connected to third switches 716. Third switches 716 are also connected to second charge collection elements 730. When activated third switches 716 transfer charge from third photosensitive elements 520 to second charge collection elements 730. In addition, fourth photosensitive elements 530 are connected to fourth switches 718. Fourth switches 718 are also connected to fourth charge collection elements 750. When activated fourth switches 718 transfer charge from fourth photosensitive elements 530 to fourth charge collection elements 750. Second and fourth charge collection elements 730,750 are arranged in second vertical collection columns 770. Charge collected by second and fourth charge collection elements 730,750 are transported vertically downward in second vertical collection columns 770 via a set of phased potentials to the readout register 210 in the manner common to CCD's.

In a similar manner as noted in the discussion of FIGS. 4A–4D, first, second, third, and fourth switches 712,714, 716,718 are shown for illustrative purposes. In typical embodiments in a CCD, these switches 712,714,716,718 are not required or used. Instead, potential shifts in the charge collection element 720,730,740,750 with respect to the photosensitive elements 410,420,520,530 are used to move electronic charge from the photosensitive elements 410,420, 520,530 to the charge collection element 720,730,740,750 as appropriate.

Figure 8A:
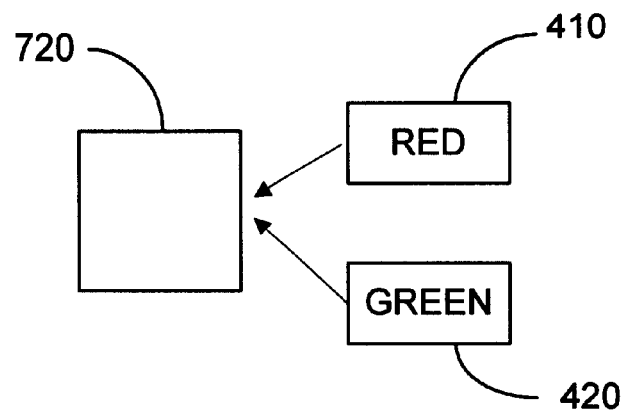
FIG. 8A is a drawing of charge flow from two photosensitive elements to the first charge collection element as described in a representative embodiment of the present patent document.
Figure 8B:
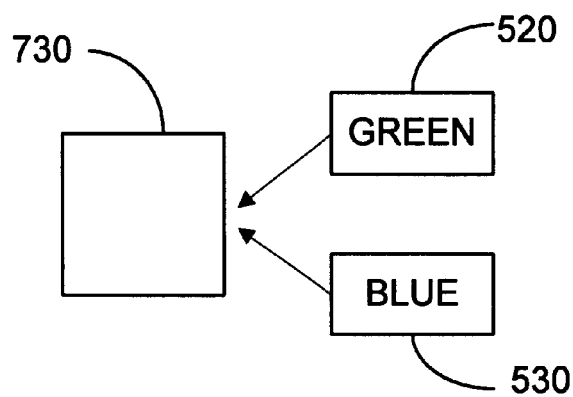
FIG. 8B is a drawing of charge flow from third and fourth photosensitive elements to the second charge collection element as described in a representative embodiment of the present patent document.

Charge from the first photosensitive element 410 is collected into the first charge collection element 720 by activating the first switch 712 or equivalently by an appropriate change in potential voltage. FIG. 8A is a drawing of charge flow from two photosensitive elements 410,420 to the first charge collection element 720 as described in a representative embodiment of the present patent document. Using CCD potential well transfer techniques, the first charge collection element 720 is placed with appropriate potential voltage changes such that charge from both the first and second photosensitive elements 410,420 is transferred into the first charge collection element 720. FIG. 8B is a drawing of charge flow from third and fourth photosensitive elements 520,530 to the second charge collection element 730 as described in a representative embodiment of the present patent document. Using CCD potential well transfer techniques, the second charge collection element 730 is placed with appropriate potential voltage changes such that charge from both the third and fourth photosensitive elements 520,530 is transferred into the second charge collection element 730.

4. Contrast Measurement

Figure 9:
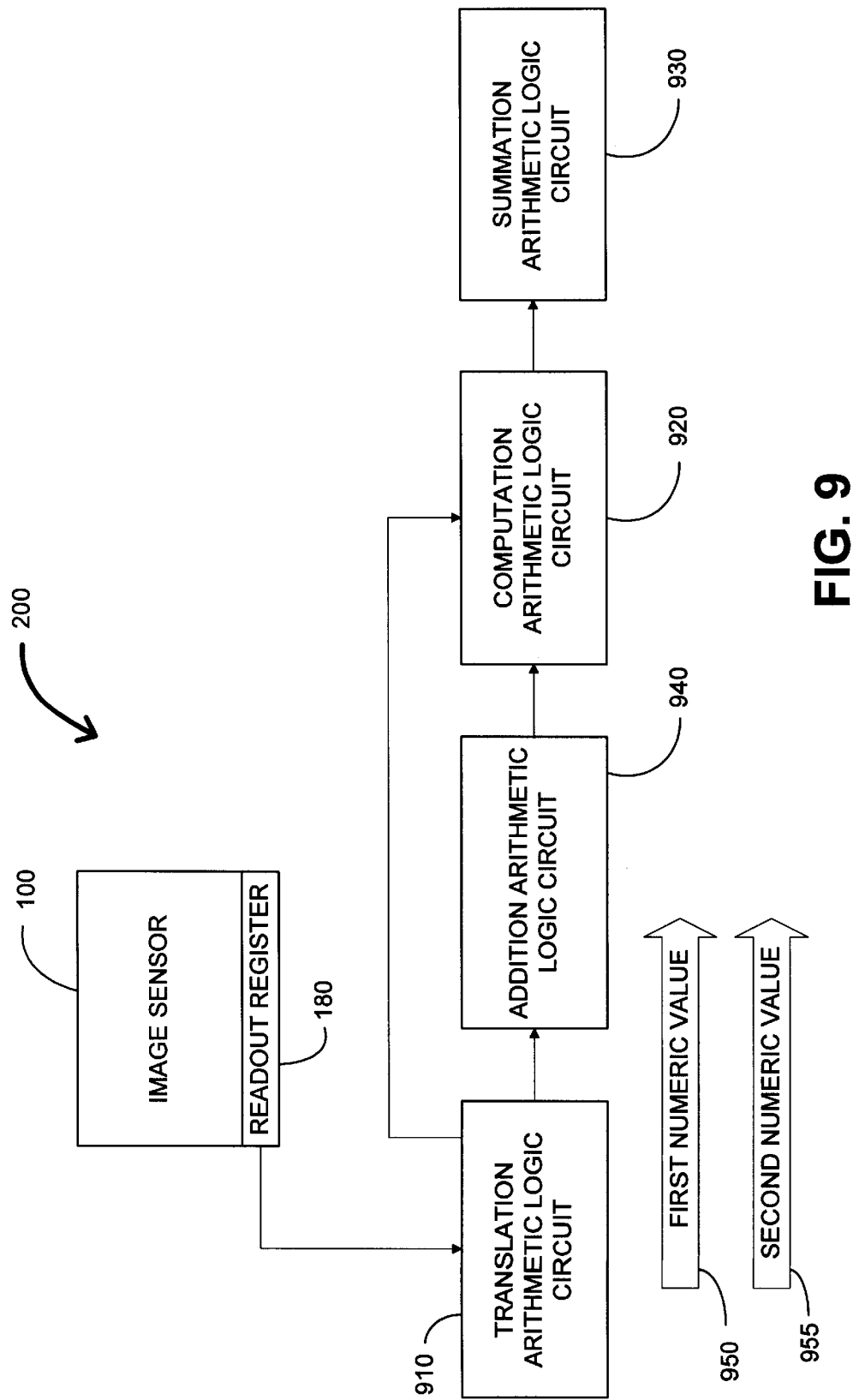
FIG. 9 is a drawing of the image detection system showing components of the detection electronics described in a representative embodiment of the present patent document.

FIG. 9 is a drawing of the image detection system 200 showing components of the detection electronics 230 described in a representative embodiment of the present patent document. In a first representative embodiment shown in FIG. 9, the detection electronics 230 comprises a translation arithmetic logic circuit 910 configured to translate electronic charge 490 into numerical values, a computation arithmetic logic circuit 920 configured to compute absolute differences, and a summation arithmetic logic circuit 930 configured to sum data. The translation arithmetic logic circuit 910 translates the electronic charge collected by the first and second charge collection elements 720,730 into an electronic signal as for example a voltage or a current. The computation arithmetic logic circuit 920 computes the absolute difference between the electronic signal output from the translation arithmetic logic circuit 910 for successive first charge collection elements 720 and separately for successive second charge collection elements 730. The summation arithmetic logic circuit 930 sums the absolute differences computed by the computation arithmetic logic circuit 920. The output of the summation arithmetic logic circuit 930 attains a maximum value corresponding to a maximum contrast when the image 155 detected by the image sensor 130 is in focus. In addition to any thermal noise in the photo-generated electronic charge since readout and conversion from charge to digital data processes occur half as often in representative embodiments as would otherwise occur, any noise added by these processes will be reduced.

In a second representative embodiment shown in FIG. 9, the detection electronics 230 comprises a translation arithmetic logic circuit 910, an addition arithmetic logic circuit 940 configured to add, a computation arithmetic logic circuit 920, and a summation arithmetic logic circuit 930. The translation arithmetic logic circuit 910 translates the electronic charge collected by the first and second charge collection elements 720,730 into an electronic signal as for example a voltage or a current. The addition arithmetic logic circuit 940 combines electronic output from the translation arithmetic logic circuit 910 for charge from the first charge collection element 720, shown illustratively as a first numeric value 950, and for charge from the second charge collection element 730, shown illustratively as a second numeric value 955, in the same pixel 540. The computation arithmetic logic circuit 920 computes the absolute difference between the electronic signal output from the addition arithmetic logic circuit 940 for charge from successive pixels 540. The summation arithmetic logic circuit 930 sums the absolute differences computed by the computation arithmetic logic circuit 920. The output of the summation arithmetic logic circuit 930 attains a maximum value corresponding to a maximum contrast when the image 155 detected by the image sensor 130 is in focus. This second representative embodiment of FIG. 9 effectively results in the binning of the charge from the first, second, third, and fourth photosensitive elements 410,420,520,530. The signal to noise ratio for the second representative embodiment of FIG. 9 is greater than that for the first representative embodiment since thermal noise in the photosensitive elements 410,420, 520,530 is uncorrelated, whereas charge from the photosensitive elements 410,420,520,530 adds as a linear sum. In addition since readout and conversion from charge to digital data processes occur half as often in the second representative embodiment as occurs in the first representative embodiment, any noise added by these processes is also reduced in the second representative embodiment of FIG. 9.

Figure 10:
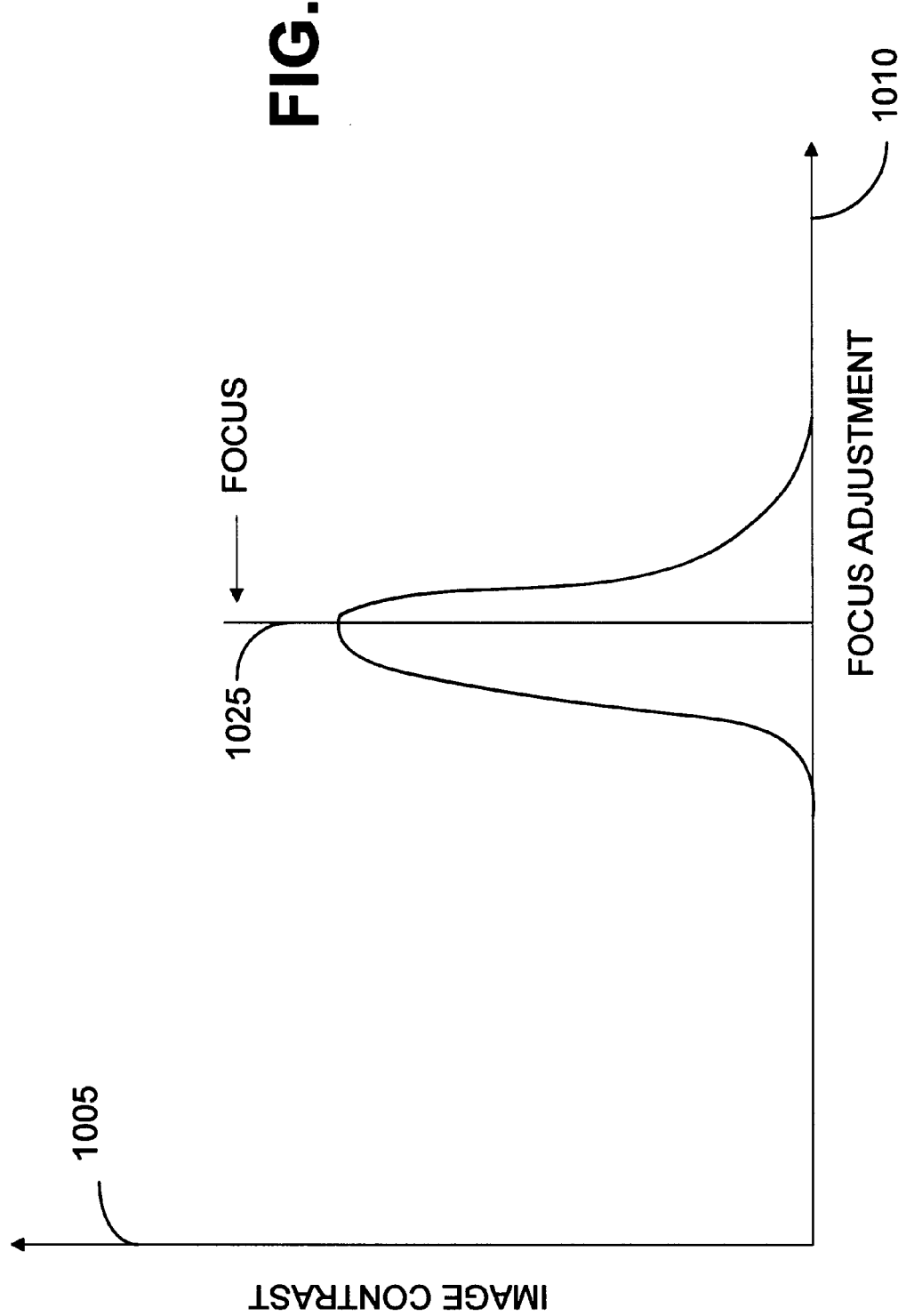
FIG. 10 is a graph of image contrast vs. focus adjustment as described in a representative embodiment of the present patent document.

FIG. 10 is a graph of image contrast 1005 vs. focus adjustment 1010 as described in a representative embodiment of the present patent document. FIG. 10 is an example output for the representative embodiments of FIG. 9. Focus occurs at the maximum output of the summation arithmetic logic circuit 930 for varying focus adjustments which is indicated by the vertical line 1025 in FIG. 10.

5. Monolithic Structure Details & Operation

Figure 11:
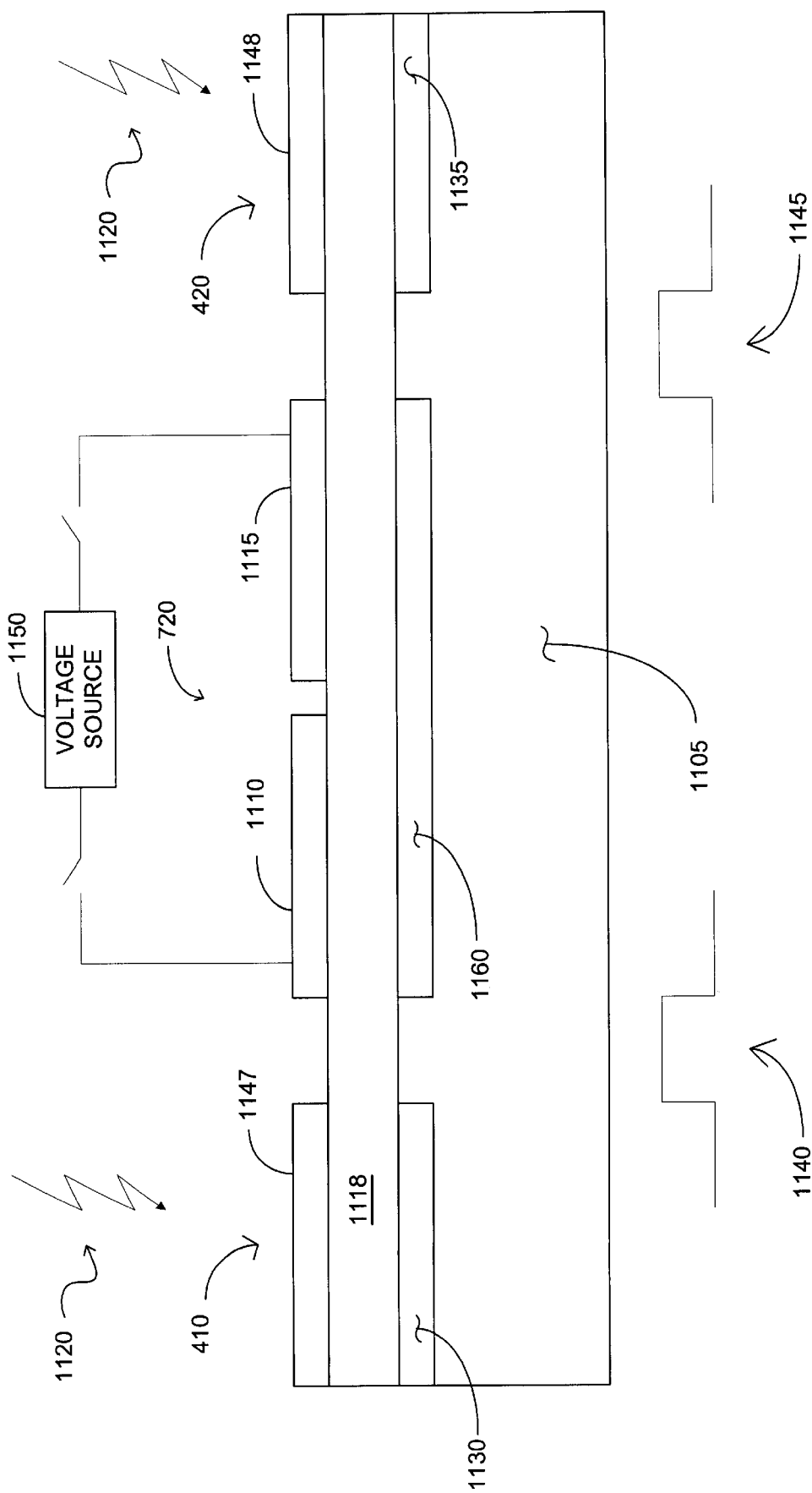
FIG. 11 is a drawing of a cross-section of two photosensitive elements and one charge collection element fabricated on a semiconductor substrate as described in a representative embodiment of the present patent document.

FIG. 11 is a drawing of a cross-section of two photosensitive elements 410,420 and one charge collection element 720 fabricated on a semiconductor substrate 1105 as described in a representative embodiment of the present patent document. For illustrative purposes only first and second photosensitive elements 410,420 are shown in FIG. 11 on opposite sides of first collection element 720. However, in a more typical implementation first and second photosensitive elements 410,420 would be fabricated on the same side of first charge collection element 720. Also, first and second photosensitive elements 410,420 and first charge collection element 720 are used for illustrative purposes in the FIG. 11 and the following description. However, it will be recognized that the drawing and illustration also describe similar elements, in particular third and fourth photosensitive elements 520,530 as well as second, third, and fourth charge collection elements 730,740,750.

In this representative embodiment, first charge collection element 720 is shown with a first conductive gate 111;0 and a second conductive gate 1115. Insulator 1118 electrically isolates first and second conductive gates 1110,1115 from the substrate 1105. Two conductive gates 1110,1115 are not required for other embodiments. In this embodiment however, the two conductive gates 1110,1115 are used to permit transfers of electronic charge from first and second photosensitive elements 410 at differing times. An optical signal 1120 incident upon first and second photosensitive elements 410,420 creates photo-generated electronic charge 490, photo-generated electronic charge 490 is also referred to herein as electronic charge 490, in first charge creation region 1130 of first photosensitive element 410 and in second charge creation region 1135 of second photosensitive element 420. This photo-generated electronic charge 490 remains in first and second charge creation regions 1130, 1135 due in part to first and second potential barrier regions 1140,1145 lying between the first charge collection element 720 and respectively first and second photosensitive elements 410,420 as previously described with respect to FIGS. 4B–4D and also due in part to potential on first and second photosensitive element gates 1147,1148 both of which are substantially transparent to optical signal 1120. Insulator 1118 electrically isolates first and second photosensitive element gates 1147,1148 from the substrate 1105. Upon application of voltage from a voltage source 1150 to the first conductive gate 1110, electronic charge 490 is transferred from the first charge generation region 1130 of the first photosensitive element 410 over the first potential barrier region 1140 to a charge collection region 1160 in the first charge collection element 720. If separate time transfer of electronic charge 490 from first and second photosensitive elements 410,420 is desired, voltage is removed from the first conductive gate 1110 and applied to the second conductive gate 1115. Upon application of voltage from the voltage source 1150 to the second conductive gate 1115, electronic charge 490 is transferred from the second charge generation region 1135 of the second photosensitive element 420 over the second potential barrier region 1145 to the charge collection region 1160 in the first charge collection element 720. Voltage is then removed from the second conductive gate 1115. Photo-generated electronic charge 490 from both first and second photosensitive elements 410,420 now resides in first charge collection element 720. This charge can be transferred from first charge collection element 720 to detection electronics 230 as previously described.

It should be noted that for illustrative purposes, only first and second photosensitive elements 410,420 and first collection element 720. However, a similar drawing could be made replacing these elements with third and fourth photosensitive elements 520,530 and second collection element 730. In such case, first conductive gate 1110 would be replaced by third conductive gate 1111, second conductive gate would be replaced by fourth conductive gate 1116, first charge creation region 1130 would be replaced by third charge creation region 1131, second charge creation region 1135 would be replaced by fourth charge creation region 1136, and charge collection region 1160 also referred to herein as first charge collection region 1160 would be replaced by second charge collection region 1161.

6. Concluding Remarks

A primary advantage of the embodiments as described in the present patent document over prior methods for automatic focus and exposure level adjustment in image detection systems 200 is the ability of the described techniques to aid in focus and exposure level adjustment under low light level conditions due to the greater obtainable signal to noise levels. An added advantage for interline interlaced-scan image sensor is a reduction in the time required for focus and exposure level adjustment as both odd and even lines 505,510 are read during the same scan. In addition, fewer scans may be required for various image sensor 130 readout architectures due to less noise in the detected charge signal.

Although specific embodiments of the invention have been described and illustrated, the invention is not to be limited to the specific forms or arrangements of parts so described and illustrated. The invention is limited only by the claims.

What is claimed is:

1. An image detection system for detecting optical signals, comprising:

a voltage source;

a first photosensitive element, wherein the first photosensitive element comprises a first charge creation region, wherein electronic charge is created by optical signals;

a second photosensitive element, wherein the second photosensitive element comprises: a second charge creation region, wherein electronic charge is created by optical signals;

a first charge collection element, wherein the first charge collection element comprises a first conductive gate, a second conductive gate, an insulator connected to first and second conductive gates, and a charge collection region connected to the insulator and wherein the first photosensitive element, the second photosensitive element, and the first charge collection element are fabricated on a semiconductor substrate;

a first switch electronically connected to the first photosensitive element and to the first charge collection element, wherein photo-generated electronic charge flows from the first photosensitive element to the first charge collection element when the first switch is closed and wherein the first switch comprises a first potential barrier region electronically connected to the first charge creation region and to the charge collection region, wherein the first potential barrier region inhibits electronic charge flow between the first charge creation region and the charge collection region, wherein a voltage of appropriate polarity and magnitude applied by the voltage source between the first conductive gate and the semiconductor substrate enables electronic charge flow between the first charge creation region and the charge collection region; and a second switch electronically connected to the second photosensitive element and to the first charge collection element, wherein photo-generated electronic charge flows from the second photosensitive element to the first charge collection element when the second switch is closed and is combined, thereby, with the charge which flowed to the first charge collection element from the first photosensitive element and wherein the second switch comprises a second potential barrier region electronically connected to the second charge region and to the charge collection region, wherein the second potential barrier region inhibits electronic charge flow between the second charge creation region and the charge collection region, wherein a voltage of appropriate polarity and magnitude applied by the voltage source between the second conductive gate and the semiconductor substrate enables electronic charge flow between the second charge creation region and the charge collection region.

2. A method for detecting an image, comprising:

exposing a first photosensitive element to an optical signal, providing the first photosensitive element comprises: a first charge creation region, wherein electronic charge is created by optical signals;

exposing a second photosensitive element to the optical signal, providing the second photosensitive element comprises: a second charge creation region, wherein electronic charge is created by optical signals;

transferring electronic charge generated by the optical signal from the first photosensitive element to a first charge collection element, providing the first charge collection element comprises: a first conductive gate; a second conductive gate; an insulator connected to first and second conductive gates; and a charge collection region connected to the insulator; and transferring electronic charge generated by the optical signal from the second photosensitive element to the first charge collection element, wherein the transferred electronic charge from the second photosensitive element is combined, thereby, with the charge transferred to the first charge collection element from the first photosensitive element, wherein the method step of transferring electronic charge from the first photosensitive element comprises applying voltage from a voltage source of appropriate polarity and magnitude to first conductive gate relative to first charge creation region and wherein the method step of transferring electronic charge from the second photosensitive element comprises applying voltage from the voltage source of appropriate polarity and magnitude to second conductive gate relative to second charge creation region.

* * * * *